UNITED STATES PATENT OFFICE.

JAMES H. DRAKE, OF ST. PAUL, MINNESOTA, AND DAVID G. WEEMS, OF CHICAGO, ILLINOIS.

COMPOSITE STONE.

SPECIFICATION forming part of Letters Patent No. 273,824, dated March 13, 1883.

Application filed December 8, 1882. (No specimens.)

*To all whom it may concern:*

Be it known that we, JAMES H. DRAKE, of St. Paul, county of Ramsey, State of Minnesota, and DAVID G. WEEMS, of Chicago, county of Cook, State of Illinois, have jointly invented certain new and useful Improvements in Composite Stone; and we do hereby declare the following to be a full, clear, and exact description of the invention, sufficient to enable others skilled in the art to make and use the same.

Our invention relates to composite stone, or, in other words, to stone formed artificially by mixing hydraulic cement with other suitable materials, reducing the same to plastic condition with water or aqueous solutions, molding into suitable forms or blocks, and thereafter "curing," as is well understood in the art.

The present invention is based upon the discovery of the peculiar qualities of a natural stone mentioned in the Reports of the United States Geological Surveys as "quartzite rock," occurring in southern Dakota and southwestern Minnesota. This quartzite is found more particularly at Sioux Falls, Minnehaha county, Dakota, where it outcrops in regular bed and is generally known as "Sioux Falls stone." This stone as it occurs in nature is remarkably hard and impossible to work by any of the usual tools, however finely tempered. It has regular cleavage planes and a sharp, crystalline fracture. When broken and prepared as hereinafter described, the resulting composite stone, having the said Sioux Falls quartzite as an ingredient, presents a close, firm, even texture, is susceptible of the highest polish, and is of great hardness, so that it is only with exceeding difficulty that it can be scratched, chipped, stained, broken, or otherwise marred, being, in short, practically indestructible. The composite is therefore of especial value in making tiles, tessellated floors or pavements, counter-slabs, wainscoting, washstand tops, monuments, and in many other relations where marbles or other polished natural stones or vitreous tiles are now employed, but which, being less durable, much sooner deteriorate under rough usage. The composite stone may also be used as a building-block, and, if preferred, be left unpolished, its fineness of grain and slight tendency to absorb moisture enabling it to withstand the severest frosts at the same time that its tenacity and hardness cause it to resist the heaviest crushing strains.

In the practice of the invention, we take from four to eight parts, by measure, of the broken and pulverized Sioux Falls stone to one part of hydraulic cement, English Portland cement being preferred. Sufficient of the Sioux Falls stone is to be reduced to condition of a fine powder by beating, stamping, or other convenient means, so that in such condition it may serve in lieu of sand or the like in uniting the materials together. The remainder of the stone may be broken to about pea-size, although some may be left of nut-size, and this is to be preferred when in a polished stone it is desired to produce mosaic effects on the surface. In such event the nut-size of stone will be so disposed in the plastic mass as to come next to the surface of the finished block. The cement and broken and pulverized Sioux Falls stone are intimately mixed together with a quantity of water sufficient to reduce the mass to a plastic condition, after which the same may be cast in molds and allowed to remain until "set," as well understood in the art. When the "form" is yet green, and after it has been removed from the mold it is preferred that the surface thereof should be coated with a slip consisting of the finely-pulverized Sioux Falls stone, thinned with water or with an aqueous solution of sodic silicate or the like, the excess of the slip being carefully scraped away, so as to leave the cast of even surface. During several days thereafter the green cast is kept moistened with water, and may be carbonated in a close chamber or subjected to free-air exposure to indurate the same as desired. When sufficiently hardened the composite stone may be polished in any well-known manner, preferably by use of an emery or corundum wheel with water and fine-powdered Sioux Falls stone as an abrader; or a rubbing-bed of Sioux Falls stone in natural condition may be employed with said powdered stone as an abrader, as before stated.

It will be understood that sand may be used in conjunction with or to the entire exclusion of the pulverized Sioux Falls stone as a binder in the composite, although we have found the best results to ensue when said pulverized stone is used alone, as heretofore described, for it is plain that in such condition it effectually fills the pores of the block, and being of like quality with the broken stone makes the cast of homogeneous texture, and causes the polish to be uniform and highly effective. Moreover, it seems in such condition to unite with cement much more closely than if it were ordinary sand, thus serving to hold the broken stone firmly in place so that no loosening thereof or of the binder next its irregular edges is noticeable upon polishing the finished block. This peculiarity of the pulverized stone in its relation as a binder enables the composite block to resist "weathering" to the utmost, at the same time, if it be polished, to preserve the finish without flaking, chipping, or like deterioration.

In lieu of water, an aqueous solution of sodic silicate or some such chemical compound well known and in common use for the purpose may be employed to reduce the mass to plastic condition suitable for molding, as described, and, if desired, any of the well-known mineral pigments to vary the color of the composite stone may be incorporated, although it possesses of itself a reddish tint not unlike Tennessee marble or Scotch granite when polished, which for most purposes it may be preferred to retain.

What we claim as new, and desire to secure by Letters Patent, is—

1. A composite stone having quartzite or Sioux Falls stone as a principal ingredient thereof, substantially as specified.

2. A composite stone consisting principally of quartzite or Sioux Falls stone united with hydraulic cement and polished, substantially as described.

In testimony whereof we have hereunto set our names to the above description and claims this 16th day of November, 1882.

JAMES H. DRAKE.
DAVID G. WEEMS.

Witnesses:
JAMES H. PEIRCE,
GEORGE P. FISHER, Jr.